US009697414B2

(12) United States Patent
Baldwin et al.

(10) Patent No.: US 9,697,414 B2
(45) Date of Patent: Jul. 4, 2017

(54) USER AUTHENTICATION THROUGH IMAGE ANALYSIS

(71) Applicant: Amazon Technologies, Inc., Reno, NV (US)

(72) Inventors: Leo B. Baldwin, San Jose, CA (US); Isaac S. Noble, Soquel, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 0 days.

(21) Appl. No.: 14/658,574

(22) Filed: Mar. 16, 2015

(65) Prior Publication Data

US 2015/0186711 A1 Jul. 2, 2015

Related U.S. Application Data

(63) Continuation of application No. 13/352,019, filed on Jan. 17, 2012, now Pat. No. 8,984,622.

(51) Int. Cl.
*G06K 9/00* (2006.01)
*G06F 21/32* (2013.01)

(52) U.S. Cl.
CPC ......... *G06K 9/00228* (2013.01); *G06F 21/32* (2013.01)

(58) Field of Classification Search
None
See application file for complete search history.

(56) References Cited

U.S. PATENT DOCUMENTS

| 7,469,055 B2 * | 12/2008 | Corcoran | G06K 9/00234 382/103 |
| 7,735,728 B2 * | 6/2010 | Wallerstorfer | G06Q 20/401 235/380 |
| 8,396,265 B1 * | 3/2013 | Ross | G06K 9/00214 382/103 |
| 8,548,207 B2 | 10/2013 | Langley et al. | |
| 2003/0163289 A1 * | 8/2003 | Whelan | G08B 13/19641 702/188 |
| 2004/0037450 A1 * | 2/2004 | Bradski | G06K 9/00228 382/103 |
| 2006/0147094 A1 * | 7/2006 | Yoo | G06K 9/00604 382/117 |
| 2006/0288234 A1 | 12/2006 | Azar et al. | |
| 2007/0092115 A1 | 4/2007 | Usher et al. | |

(Continued)

OTHER PUBLICATIONS

US Non-Final Office Action dated Jan. 15, 2014 issued in U.S. Appl. No. 13/352,019.

(Continued)

*Primary Examiner* — Hadi Akhavannik
(74) *Attorney, Agent, or Firm* — Polsinelli LLP

(57) ABSTRACT

A user of a computing device can be authenticated using image information captured by at least one camera of the computing device. In addition to analyzing the image information using a facial recognition algorithm, for example, variations in color of a portion of the captured image information corresponding to a user's face can be monitored over a period of time. The variations can be analyzed to determine whether the captured image information likely corresponds to an actual human user instead of a representation (e.g., photo) of a human user, such as where the chroma variations in at least a red channel occur with an oscillation frequency and amplitude consistent with changes due to a pulse or heartbeat.

19 Claims, 5 Drawing Sheets

(56) References Cited

U.S. PATENT DOCUMENTS

| | | | | |
|---|---|---|---|---|
| 2007/0237360 A1* | 10/2007 | Irie | ............... | G06K 9/00261 382/103 |
| 2008/0247609 A1* | 10/2008 | Feris | ............... | G06K 9/00369 382/118 |
| 2009/0003652 A1* | 1/2009 | Steinberg | ............... | G06K 9/00228 382/103 |
| 2010/0007665 A1* | 1/2010 | Smith | ............... | G06T 13/40 345/473 |
| 2010/0166310 A1* | 7/2010 | Chan | ............... | G06K 9/00234 382/181 |
| 2011/0262001 A1* | 10/2011 | Bi | ............... | G06K 9/00234 382/103 |
| 2011/0317872 A1* | 12/2011 | Free | ............... | G06K 9/00228 382/103 |
| 2013/0167212 A1 | 6/2013 | Azar et al. | | |

OTHER PUBLICATIONS

US Final Office Action dated Jul. 30, 2014 issued in U.S. Appl. No. 13/352,019.

US Notice of Allowance dated Nov. 24, 2014 issued in U.S. Appl. No. 13/352,019.

\* cited by examiner

USER AUTHENTICATION THROUGH IMAGE ANALYSIS

CROSS-REFERENCES TO RELATED APPLICATIONS

This application is a continuation of U.S. application Ser. No. 13/352,019, entitled "USER AUTHENTICATION THROUGH VIDEO ANALYSIS", filed Jan. 17, 2012, which issued on Mar. 17, 2015 as U.S. Pat. No. 8,984,622 the full disclosures of which are incorporated herein by reference for all purposes.

BACKGROUND

Users are increasingly utilizing electronic devices for a wide variety of tasks. Many of these tasks relate to confidential or sensitive information that a user might want to protect from unauthorized access. While conventional approaches such as passwords provide some level of security, passwords can be obtained in a number of different ways that enable others to pose as a user and gain access to the user information. Accordingly, users are increasingly turning to other security mechanisms, such as may be based on biometrics, that attempt to identify or authenticate a person attempting to gain access to user information. It is still possible in many situations, however, to defeat or "spoof" a biometric security feature to gain unauthorized access. For example, a device might capture an image to attempt to perform facial recognition on the person attempting to gain access, where access is only provided upon identifying features known to correspond to an authorized user. If another person holds up a photo of the authorized user, however, the two-dimensional image captured by the camera can be indistinguishable from a similar image captured of the actual user, such that the person can gain access by using the photo to fool the authentication algorithm.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to identifying and/or authenticating a user of a computing device. In particular, various embodiments utilize image information to not only identify a user, but also verify that the user is actually a physical person and not a false representation of that user. For example, a computing device can capture one or more frames of video information to use with a facial recognition process, in order to attempt to verify an identity of a current user of the device. The computing device also can capture and analyze video over a period of time sufficient to encompass one or more cycles of a human pulse or heartbeat. The location of the user's head in the captured video can be determined, and color values of a portion of the video corresponding to the head can be analyzed for variations corresponding to the fluctuations in a human face for a human pulse. For example, the red values of a human face can vary with the pulse cycles as the amount of blood flow varies. While this variation may be too subtle to be noticed by the human eye, a video camera of a computing device can be sensitive enough to detect the variations. These variations then can be used to verify that captured image information reflects an actual person, and not a generated or obtained image of a person. Other fluctuations in the video information can be determined as well, such as the blinking of a user's eyes, rotation of the user's head, and other such information.

Many other alternatives and variations are described and suggested below in relation to at least some of the various embodiments.

Figure 1:
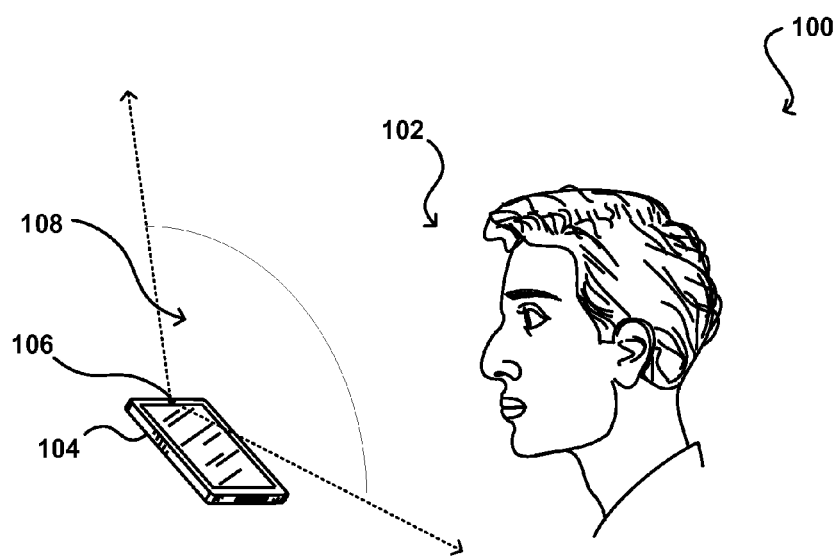
FIG. 1 illustrates an example situation wherein a computing device is capturing image information including at least a portion of a user of the device in accordance with various embodiments.

FIG. 1 illustrates an example situation 100 wherein a person 102 is attempting to gain access to a computing device 104. The computing device 104 in this example includes at least one image capture element 106 that is operable to capture image information over a range of angles 108, or field of view, with respect to the device. Although a portable computing device (e.g., a cell phone, an electronic book reader, or tablet computer) is shown, it should be understood that any electronic device capable of receiving and processing input, or at least capable of rendering and/or displaying visual content, can be used in accordance with various embodiments discussed herein. Example devices can also include, for example, desktop computers, notebook computers, personal data assistants, smart phones, video gaming consoles, television set top boxes and portable media players.

The camera 106 in this example is positioned on the device such that the person 102 likely will be at least partially included in the field of view 108 when the person is interacting with the device, such as by looking and/or interacting with a display screen of the device. It should be understood, however, that there can be additional and/or alternative cameras placed in similar or alternative locations in accordance with various embodiments, and that information from any or all of these cameras can be analyzed as appropriate. For example, a computing device might have a high resolution still camera that is able to capture images useful for performing facial recognition, and might have a lower resolution video camera that can be useful for performing pulse detection. In other embodiments, a single camera might be used to capture image information for both types of analysis, while still other embodiments might utilize stereo cameras or other elements to determine distance information or perform three dimensional modeling, among other such aspects. As mentioned, some devices might have digital still cameras that are able to capture single images at specific points in time, or digital video cameras that are able to continuously capture image information, which can be referred to as a set of frames in at least some embodiments. In some embodiments, a series of still images can be captured over a period of time and analyzed for purposes of color variation and pulse detection instead of video information. Also, for a process such as image recognition to be relatively accurate, the image being analyzed may have to meet some minimum criteria. This can include, for example, adequate lighting and contrast, but can also include factors such as quality of focus and spatial resolution. Accordingly, a device can include additional elements as well, such as illumination elements and focusing optics as discussed elsewhere herein.

Figures 2A, 2B:
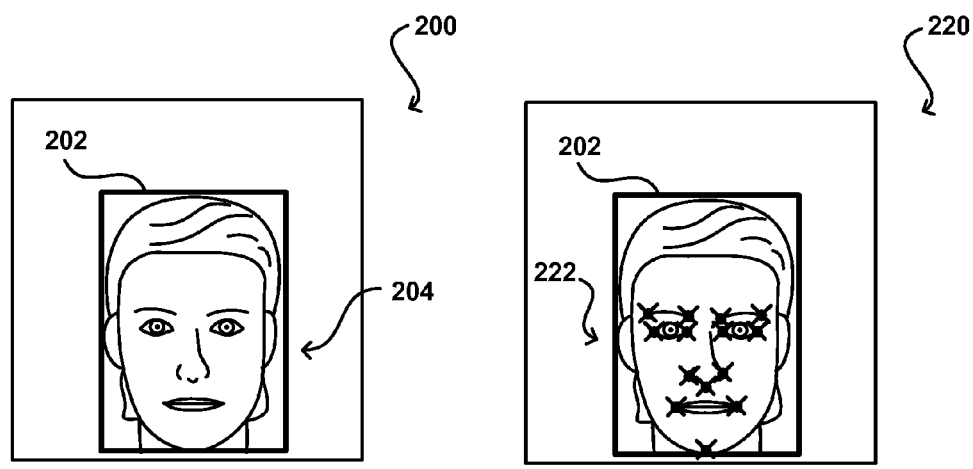
FIGS. 2(a) and 2(b) illustrate an example of a head location and feature locations that can be determined from a captured image in accordance with various embodiments.

As mentioned, it can be desirable in various situations to capture one or more images or frames of video for using in authenticating an identity of a person attempting to access information and/or functionality through the computing device. FIG. 2(a) illustrates an example image 200 that can be captured by a camera of a computing device. In this example, the user's head 204 is contained within the image. A head or face detection algorithm can be used in some embodiments to attempt to locate a portion 202 of the image 200 that corresponds to the approximate head location in the image. The head or face detection algorithm can include any appropriate algorithm known or used for such purposes, such as a template matching algorithm, a neural network algorithm, a Fisher linear discriminant algorithm, a maximal rejection classifier algorithm, a support vector machine algorithm, an edge filtering algorithm, an edge detection algorithm, and the like. The ability to locate the head position in an image can reduce the amount of resources otherwise needed to perform facial recognition, as the analysis can be performed only on the portion of the image corresponding to the head position. Further, in some embodiments facial recognition might not be performed unless a head or face can first be detected in the captured image.

In this example, the detected head portion can be analyzed using one or more facial recognition algorithms to attempt to identify the person contained in the image. As illustrated in FIG. 2(b), this can include identifying unique or distinguishing points 222, landmarks, geometric shapes or distances, or other such features on the face, which can be compared or mapped against information stored for an authorized user of the device. Example facial recognition algorithms can include, for example, a linear discriminate analysis algorithm, a Fisherface algorithm, a Hidden Markov model-based algorithm, a principal component analysis algorithm, and a neuronal motivated dynamic link matching algorithm, among others. The image should be of sufficient resolution, clarity, and focus, for example, enabling the algorithms to adequately match the image to information stored for the user. As known, a facial recognition algorithm can take an amount of time to analyze an image, such that other processes can be executed during the analysis.

As mentioned, systems and methods in accordance with various embodiments can also attempt to verify that the face represented in the image(s) undergoing the recognition process corresponds to an actual human face, and not a representation of a human face. One such approach involves capturing video information and/or a series of images over a period of time sufficient to represent one or more cycles of a human pulse. In at least some embodiments, the video or image capture can occur during the performance of the facial recognition process on an initial image or video frame, etc.

Figure 3A:
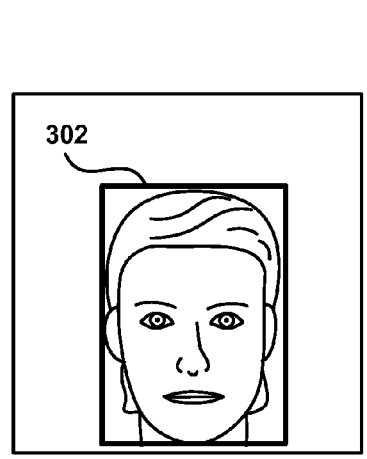
FIGS. 3(a)-3(d) illustrate stages of an image being analyzed to detect changes in chroma values in accordance with one embodiment.
Figure 3B:
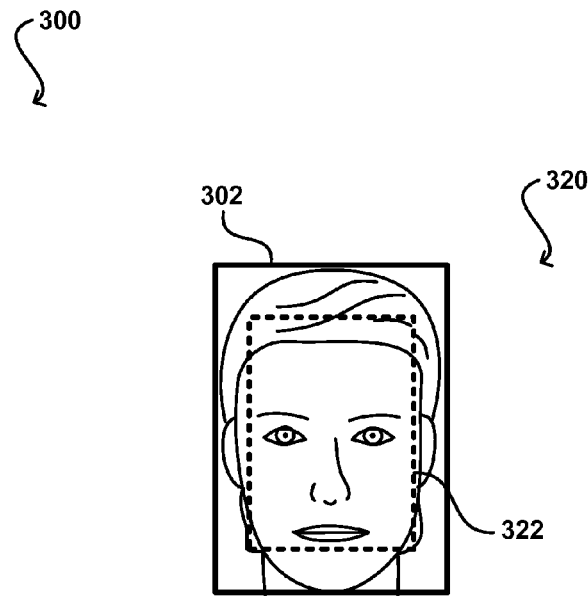

As illustrated in FIG. 3(a), at least some embodiments also utilize a face or head detection algorithm as discussed above to attempt to locate an approximate head or face position 302 in a captured image or video frame 300. In approaches that attempt to detect color variations in the person's face, it can improve results in at least some embodiments to sufficiently isolate the person's face, such that variations in the background of the image do not create false positives (or false negatives in some instances). As illustrated in the isolated image portion 320 of FIG. 3(b), in some embodiments an algorithm can analyze only a central portion or region 322 of the determined head position 302, in order to attempt to include primarily facial area and not hair or areas just outside the face region due to differences between the actual shape of the user's face and the shape of the bounding box 302 or other such boundary.

Figure 3C:
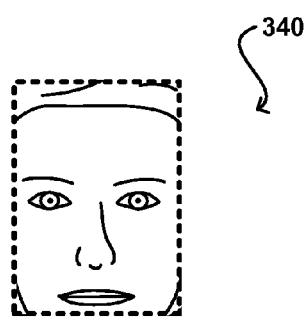
Figure 3D:
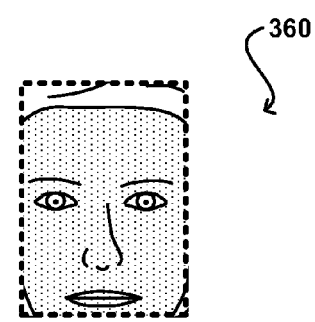

Once the facial region to be analyzed is determined, and tracked or updated over time in the video information, one or more color analysis algorithms can attempt to detect certain variations in that region over time. For example, the image portions 340, 360 of FIGS. 3(c) and 3(d), respectively, show (with an exaggerated difference) that there can be variations in the color of a person's face over time, due to changes in blood flow corresponding to the human pulse, which can be detected by a camera of the computing device. In this particular example, the changes will primarily be detected in a red channel, such as in the chroma (color purity), intensity, or saturation of red colors in the image portions. It should be understood, however, that variations can similarly be detected in other color channels or portion as well. For example, as blood is pushed through the human face as a result of a pulse or heartbeat, the face will appear slightly redder. During other periods, the face will appear somewhat less red. By monitoring for changes in color corresponding in time to a period of a human pulse, and in amount of variance to that of human skin, a determination can be made as to whether the face in the image likely corresponds to an actual user and not a photograph or other such representation.

Figure 4:
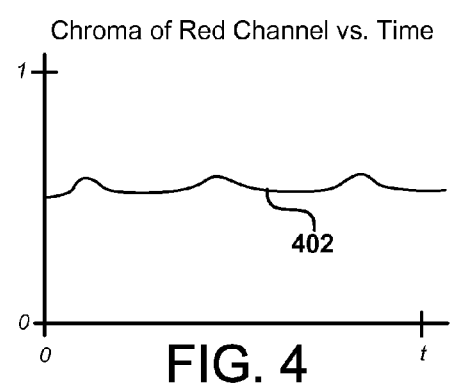
FIG. 4 illustrates an example plot of intensity values over time for a red chroma channel that can be generated in accordance with various embodiments.

FIG. 4 illustrates an example plot 400 of the chroma value for a red channel of an image over time. In this example, the facial region of the image can be determined and the colors separated into appropriate channels or components (e.g., red, blue, and green). The red values can be analyzed over time, and factors such as the chroma (or intensity, saturation, or other such measure) analyzed to determine whether the values 402 vary in time corresponding to the period of a human pulse, and vary in value or amplitude within a range appropriate for human skin. In the example plot, the red values vary periodically at a rate within the range of a human pulse, and with an appropriate amount of change, such that the device can determine that the face being imaged is likely an actual human face. "Chroma" as used herein refers to the perceived "strength" of a color and is well understood in the art to represent a degree of visual difference from a neutral gray of the same brightness, or the amount of color of an image relative to the brightness of an image of a white object similarly illuminated.

Figure 5:
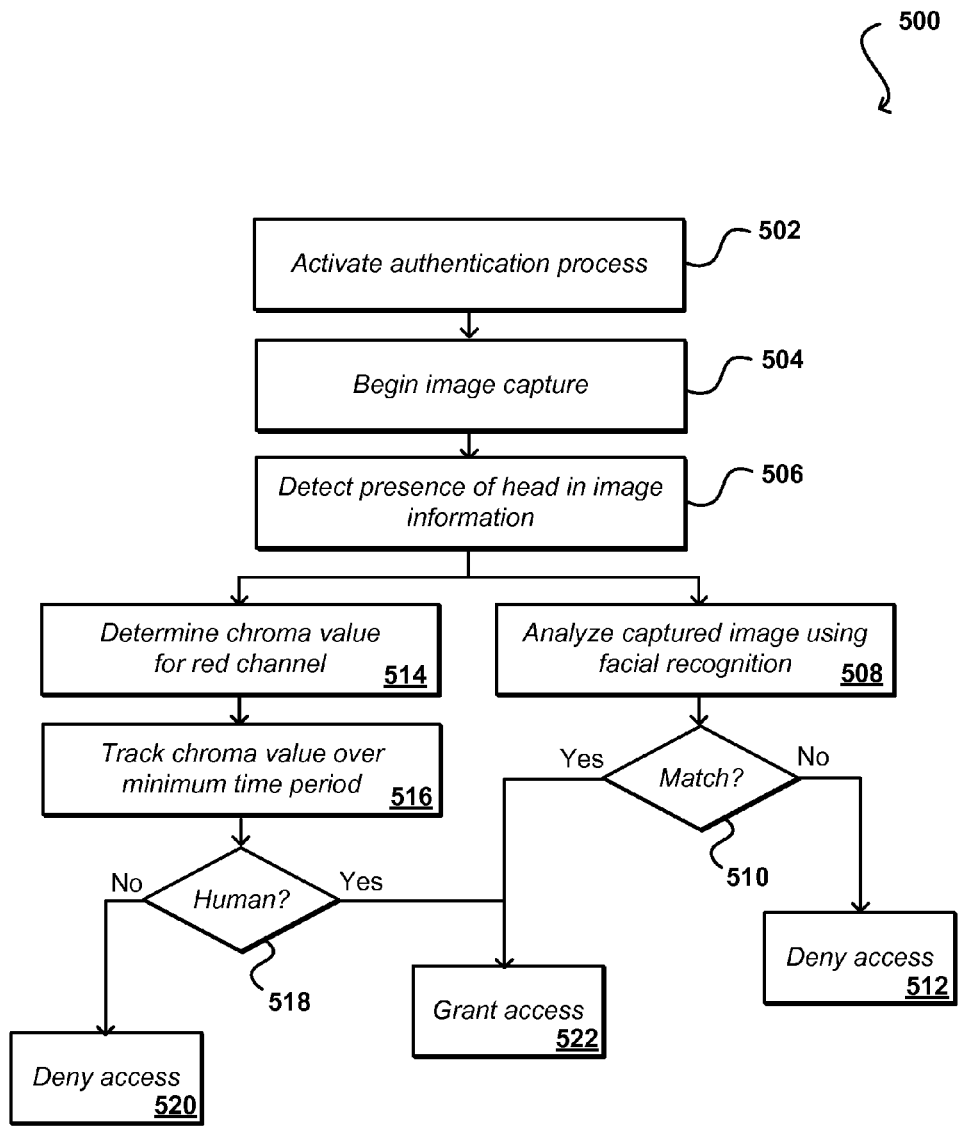
FIG. 5 illustrates an example process for authenticating a user using image information that can be used in accordance with various embodiments.

FIG. 5 illustrates an example process 500 for authenticating a user through such techniques, which can be used in accordance with various embodiments. It should be understood, however, that there can be additional, fewer, or alternative steps performed in similar or alternative orders, or in parallel, within the scope of the various embodiments unless otherwise stated. In this example, an authentication process is activated 502 on the computing device. The authentication process can be activated in response to any appropriate event, such as a person attempting to access certain data or functionality on the device, a person coming within a field of view of at least one camera of the device, an activation of the device, or another such occurrence. If not already active, the device can begin image capture 504 using at least one camera having a person's face at least partially contained within a field of view of the camera. In this example, the image information will be analyzed to attempt to detect 506 the presence of a human head or face in the image information.

Once a human head or face is detected, the captured image information can be analyzed 508 using facial recognition to attempt to authenticate an identity of the user. In some embodiments, this can include capturing a single, relatively high resolution image for use in the recognition process, which might be captured separately from the other image capture. In other embodiments, this can include analyzing a frame or image from the ongoing image capture. Other approaches to obtaining an image for analysis can be used as well. As a result of the image recognition process, it will be determined whether there was a match 510 within at least a minimum level of confidence or other such measure. If not, then the person will not be able to be authenticated and will be denied access 512.

During the facial recognition analysis in this example, the chroma value for a red channel can be determined 514 for the head or face position in the captured image information. As discussed, this might be a central region of the determined head position, or other such portion of the image information, which can include video or a series of still images. The chroma value for the red channel can be tracked 516 over a minimum period of time, such as at least one cycle of a typical human pulse. The changes in chroma value tracked over time can be analyzed to determine whether there are changes that correspond in time and variation to an actual human face. If the values are determined 518 to not correspond to a human face with at least a minimum level of certainty, confidence, or other such measure, the person can be denied access 520. If, however, the captured image information is determined to correspond to an actual human user, and the facial features match an authorized user, the person can be granted access 522 to the data, functionality, or other information on the computing device.

In some embodiments, a person could attempt to spoof such a process by flashing a red light on a photo of a user held up, or otherwise positioned, in front of a camera of a computing device. It can be difficult, however, to provide an amount of light that causes a realistic change of an appropriate value using a conventional photograph or image. Similarly, a video display of a person's face can have distortions due to differences in frame rate or timing that can make it difficult to spoof both the facial recognition and pulse detection processes. In at least some embodiments, a device might utilize stereo cameras or a distance sensor, or other such element(s) to attempt to detect distance information as well, which can be used to generate at least a basic three-dimensional model of the determined facial region. The three-dimensional data can be used to verify that the region corresponds generally to the shape of a human head, and not a flat screen or image.

In some embodiments, a pulse detection process can utilize other portions of the user, such as a hand, arm, or shoulder. In many cases, however, the face will be more likely to be exposed and within the field of view of at least one camera. Further, the face can be less likely to move significantly than a human hand unless the user has to hold the hand still in front of the camera, which can potentially degrade the user experience.

Various other techniques can be used to attempt to verify an actual human user as well. For example, the video information can be analyzed to detect the presence of one or more blinks of the eyes of the user over a period of time. If no blink is detected after a maximum period of delay, such as 45 seconds to a minute, it can be determined that the image information does not correspond to a human user. In some embodiments, a light can be flashed when a confidence level cannot be reached and the image information can be analyzed to see if the pupils contract as would those of a human user. Again, however, such an approach might not be optimal from a user experience standpoint. In some embodiments, the device could prompt the user to perform an action, such as to smile or rotate his or her head, which can be difficult to replicate with a photo or stored video file. In some embodiments, the device can show a funny or startling image or other such information, for example, and determine whether the user reacts to the image, although reactions can vary significantly between different users. In some embodiments, an infrared emitter and detector pair can be used to attempt to determine aspects such as pulse and pupil reflection, which also can be indicative of a human user. It can be desirable to utilize such approaches as additional sources of information when results cannot be determined within an acceptable level of confidence, as may be due to a number of factors such as an amount or type of ambient light, variations in skin tone, amount of makeup applied, body temperature, resolution of the camera, and other such factors.

In some embodiments, a heartbeat can be considered to be on the order of about one beat per second. If a video camera captures information at a rate of at least 15-30 frames per second, as is typical for even low quality conventional video cameras, the number of data points will be more than adequate to determine variations due to heart rate. Further, a couple seconds of video should be sufficient to capture at least two full cycles of information, which can be sufficient to determine rate in addition to amount of variation. The frequency at which the red colors change can be used to determine the use's approximate heartbeat, and the frequency must be within a determined range of potential heart beats in order for the user to be authenticated as an actual person.

In at least some embodiments, the captured video does not need to be buffered any longer than is needed for color analysis. For example, a chroma triplet (e.g., R, G, B) of values can be determined for the region of interest in each frame, and that information stored for subsequent analysis, such as may use the plotting of FIG. 4. Such an approach can result in a relatively small data set to be analyzed after the determined period of time for monitoring pulse. Further, as long as a facial region can be determined with a reasonable degree of certainty, the video camera can operate in a relatively low resolution mode, as only enough information is needed to detect a change in color values over time.

In addition to processes discussed herein, other approaches to utilizing photoplethysmography (PPG) can be used to detect a cardiovascular blood volume pulse through changes in the light reflected (or transmitted) from a person's skin. Pulse measurements can be made using images of the human face illuminated with ambient light, or another such source. The detected light can be analyzed along any appropriate channels using any appropriate color sensors, such as may include red, blue, and green among others. The observed weights of the color information from each channel can be measured over time to determine changes due to the facial blood vessels over the cardiac cycle. In some embodiments the color values can be spatially averaged over all pixel values in the analyzed region. One or more filters can be used to process the color signals as well as known for such purposes. In one embodiment, the red channel is ratioed with the blue and/or green channels (R/(B+G), R/B, or R/G) so that the signal analyzed for pulse detection is normalized for ambient light conditions even if ambient light conditions are changing and the modulation of the signal is maximized. In another embodiment, the red channel is ratioed with the luminance of the signal R/L where luminance is understood in the art to the brightness of the image independent of color information and is equivalent to R/(R+G+B). Said luminance value is often generally available and this ratio R/L may be slightly easier to obtain than the aforementioned R/(G+B) and will suffer only slightly less modulation strength but may provide a better normalization against difficult ambient lighting situations. All of these methods whereby the red component is measured relative to the other components or to the overall brightness will be referred to as normalized red chroma.

Figure 6:
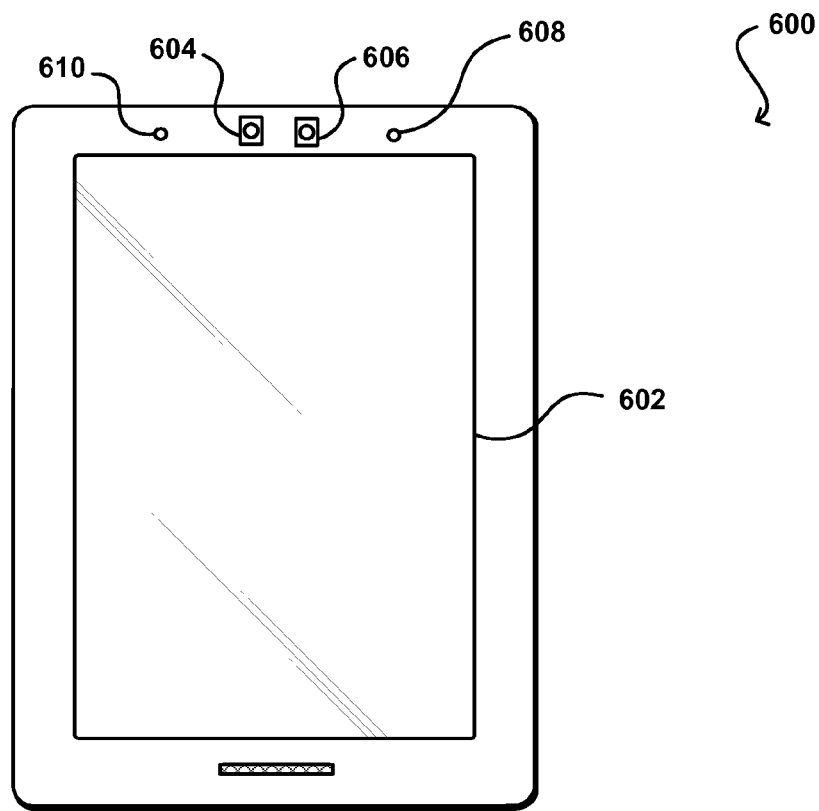
FIG. 6 illustrates an example device that can be used in accordance with various embodiments.

FIG. 6 illustrates an example of an electronic computing device 600 that can be used in accordance with various embodiments. As discussed, various other types of electronic devices can be used as well within the scope of the various embodiments. This example device includes a display element 602 for displaying information to a user as known in the art. The display can be any appropriate display element, such as an LCD or OLED display screen that is touch sensitive or otherwise allows for input in at least some devices. The example device also includes at least one camera element for capturing image information using ambient light as known in the art. The example device illustrated in FIG. 6 includes a higher resolution digital camera 604 for capturing still images useful for facial recognition and a lower resolution video camera 606 for capturing video useful for pulse detection, although various other combinations or selections of cameras can be used as well as discussed elsewhere herein. The cameras are positioned such that during normal operation, when a user is looking at or interacting with the display screen 602, the user will likely be positioned at least partially within a field of view of the cameras 604, 606. In some embodiments, the device can also (or alternatively) include one or more an infrared (IR) emitters and detectors configured to emit IR radiation and detect the IR radiation reflected from a user (or other such surface or object). The example device also includes a light sensor 608 operable to determine an amount of ambient light near the device, as well as at least one illumination element 610, such as a white light LED, operable to provide illumination when the light sensor (or another element) detects a relatively low amount of ambient light, etc.

Figure 7:
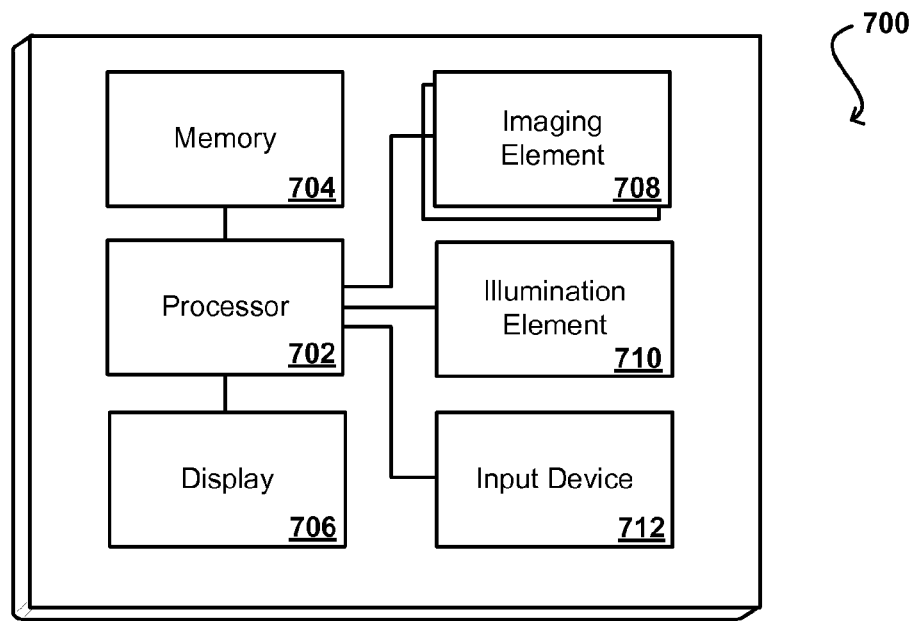
FIG. 7 illustrates an example set of components that can be utilized in a device such as that illustrated in FIG. 6.

FIG. 7 illustrates a set of basic components of an example computing device 700 such as the devices described with respect to FIG. 6. While a portable smart device is depicted in many examples herein, the computing device could be any appropriate device able to receive and process input commands, such as a personal computer, laptop computer, television set top box, cellular phone, PDA, electronic book reading device, video game system, or portable media player, among others. In this example, the device includes a processor 702 for executing instructions that can be stored in a memory device or element 704. As known in the art, the device can include many types of memory, data storage or computer-readable media, such as a first data storage for program instructions for execution by the processor 702, a separate storage for images or data, a removable memory for sharing information with other devices, etc. The device typically will include some type of display element 706, such as a liquid crystal display (LCD), although devices such as portable media players might convey information via other means, such as through audio speakers. As discussed, the device in many embodiments will include at least one imaging element 708 such as a camera, sensor, or detector that is able to image a facial region of a user. The imaging element can include any appropriate technology, such as a CCD or CMOS imaging element having a sufficient resolution, focal range and viewable area to capture an image of the user when the user is operating the device. Methods for capturing images using an imaging element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application or other device. In some embodiments, the device can include at least one illumination element 710 that is able to determine and/or provide an amount of light around the device.

The device can include at least one additional input device 712 able to receive conventional input from a user. This conventional input can include, for example, a push button, touch pad, touch-sensitive element used with a display, wheel, joystick, keyboard, mouse, keypad or any other such device or element whereby a user can input a command to the device. Some devices also can include a microphone or other audio capture element that accepts voice or other audio commands. For example, a device might not include any buttons at all, but might be controlled only through a combination of visual and audio commands, such that a user can control the device without having to be in contact with the device. As will be discussed later herein, functionality of these additional input devices can also be adjusted or controlled based at least in part upon the determined gaze direction of a user or other such information. A number of other components can be used as well within the scope of the various embodiments. For example, thermal imaging or another such approach could be used to attempt to determine and track the position of at least some aspect of a human user, or determine a human heat signature as verification that the person being analyzed is actually a human and not a representation of a human.

Figure 8:
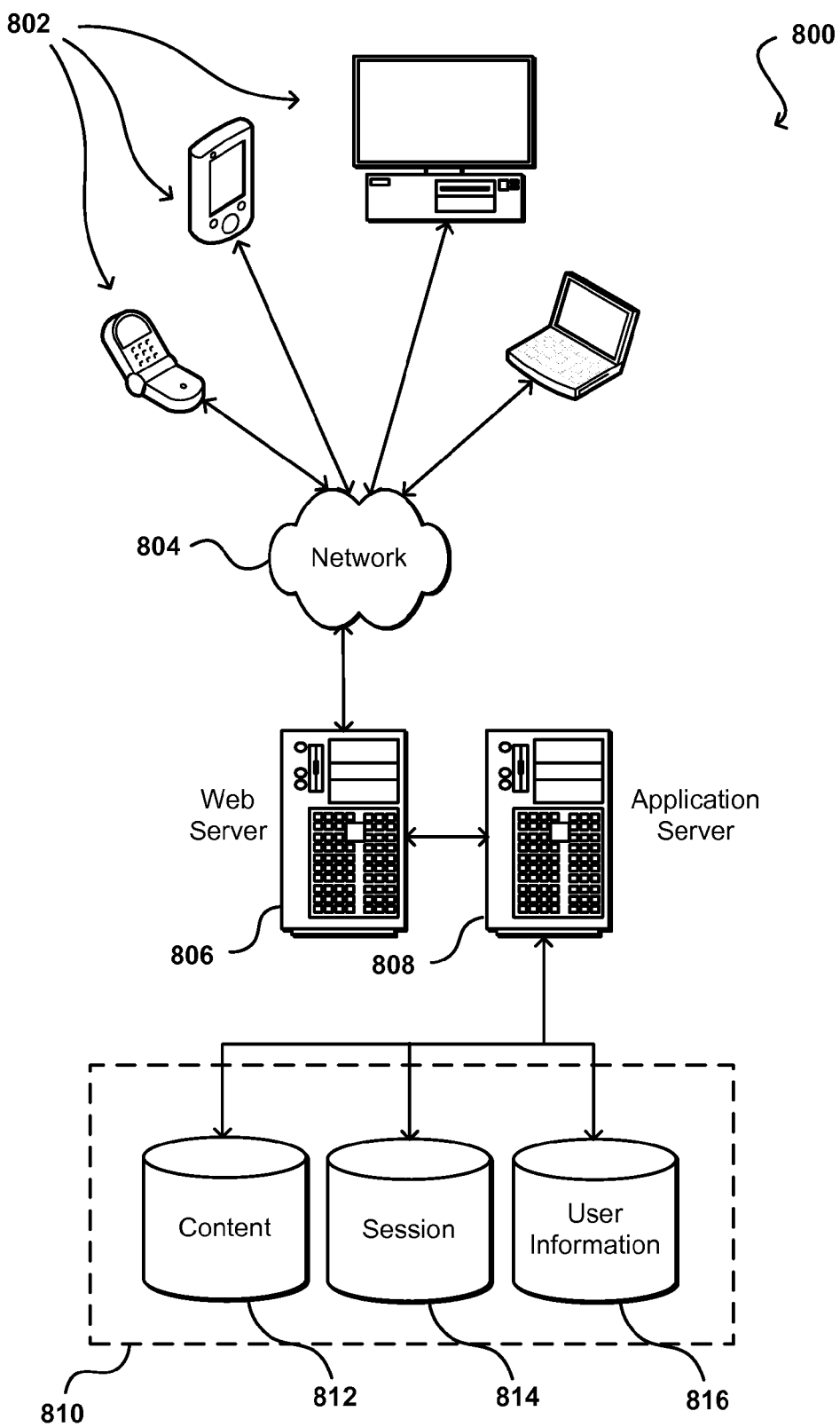
FIG. 8 illustrates an example an environment in which various embodiments can be implemented.

A computing device used for such purposes can operate in any appropriate environment for any appropriate purpose known in the art or subsequently developed. Further, various approaches discussed herein can be implemented in various environments for various applications or uses. Portions of the analysis also can be sent or offloaded to remote devices which might have more available resources and/or capacity. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The environment 800 shown includes a variety of electronic client devices 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. Each client device can be capable of running at least one motion or orientation-controlled interface as discussed or suggested herein. In some cases, all the functionality for the interface will be generated on the device. In other embodiments, at least some of the functionality or content will be generated in response to instructions or information received from over at least one network 804.

The network 804 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a primary content provider 806 and a supplemental content provider 808. Each provider can include at least one Web server 806 for receiving requests from a user device 802 and serving content in response thereto, although for other networks an alternative device serving a similar purpose could be used as would be apparent to one of ordinary skill in the art.

Each content provider in this illustrative environment includes at least one application server 812, 814, 822 or other such server in communication with at least one data store 816, 818, 824. It should be understood that there can be several application servers, layers, and/or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. An application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 802 and an application server, can be handled by the respective Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

Each data store can include several separate data tables, databases, or other data storage mechanisms and media for storing data relating to a particular aspect. For example, the page data store 816 illustrated includes mechanisms for storing page data useful for generating Web pages and the user information data store 818 includes information useful for selecting and/or customizing the Web pages for the user. It should be understood that there can be many other aspects that may need to be stored in a data store, such as access right information, which can be stored in any of the above listed mechanisms as appropriate or in additional mechanisms in the data store. Each data store is operable, through logic associated therewith, to receive instructions from a respective application server and obtain, update, or otherwise process data in response thereto. In one example, a user might submit a search request for a certain type of content. In this case, the data store might access the user information to verify the identity of the user, and can access the content information to obtain information about instances of that type of content. The information then can be returned to the user, such as in a results listing on a Web page that the user is able to view via a browser on the user device 802. Information for a particular instance of content can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature, and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
receiving, by a computing device at a first time period, a first image frame including a first representation of at least a portion of a face;
analyzing the first image frame to determine that the first representation corresponds to an identity authorized to access the computing device;
receiving, by the computing device at a second time period, image data including a plurality of representations of at least the portion of the face;
analyzing the image data frame to determine a rate of coloration change of the plurality of representations;
determining that the rate of coloration change corresponds to a heart rate associated with a living human; and
granting access to a functionality of the computing device requiring authentication.

2. The computer-implemented method of claim 1, further comprising:
executing a facial recognition algorithm using the first image frame to determine that the first representation corresponds to the identity.

3. The computer-implemented method of claim 1, further comprising:
capturing the first image frame using a digital still camera.

4. The computer-implemented method of claim 1, further comprising:
capturing the second image data frame and the third image frame using a digital video camera.

5. The computer-implemented method of claim 4, further comprising:
capturing the first image frame at a first resolution of a digital still camera that is a higher resolution than a second resolution of the digital video camera when used to capture the image data.

6. The computer-implemented method of claim 1, wherein the coloration change corresponds to a change in at least one chroma component.

7. The computer-implemented method of claim 6, wherein the at least one chroma component includes at least a normalized red chroma component.

8. The computer-implemented method of claim 1, further comprising:
analyzing the image data to detect at least one of a blink, a facial expression, or a head rotation.

9. The computer-implemented method of claim 1, further comprising:
locating a head in at least one captured image frame before analyzing at least one of the first image frame or the image data.

10. The computer-implemented method of claim 1, further comprising:

flashing an illumination element of the computing device one or more times within the second time period; and analyzing the image data to determine a reaction of a pupil to the illumination element being flashed.

11. The computer-implemented method of claim 1, further comprising:

providing a prompt for a predefined head movement; and analyzing the image data to detect performance of the predefined head movement.

12. The computer-implemented method of claim 1, further comprising:

detecting motion near the computing device before capturing the first image frame.

13. A computing device, comprising:

one or more processors;

one or more cameras; and a memory device including instructions that, when executed by the one or more processors, cause the computing device to:

capture first image information using the one or more cameras, the first image information including one or more first representations of at least a portion of a face;

analyze the first image information to determine that the one or more first representations correspond to an identity authorized to access the computing device;

capture second image information using the one or more cameras, the second image information including a plurality of one-Br-mere second representations of at least the portion of the face;

analyze the second image information to determine a rate of coloration change of the plurality of second representations;

determine that the rate of coloration change corresponds to a heart rate associated with a living human; and grant access to a functionality of the computing device requiring authentication.

14. The computing device of claim 13, wherein the coloration change corresponds to changes in at least one chroma component.

15. The computing device of claim 13, wherein the instructions when executed further cause the computing device to:

analyze the second image information to detect at least one of a blink, a facial expression, or a head rotation before granting the access to functionality of the computing device.

16. The computing device of claim 13, wherein the instructions when executed further cause the computing device to:

locate a representation of a head in at least one captured image frame before analyzing at least one of the first image information or the second image information.

17. A non-transitory computer-readable storage medium storing instructions that, when executed by one or more processors of a computing device, cause the computing device to:

capture first image information using one or more cameras of the computing device, the first image information including one or more first representations of at least a portion of a face;

analyze the first image information to determine that the one or more first representations correspond to an identity authorized to access the computing device;

capture second image information using the one or more cameras, the second image information including a plurality of second representations of at least the portion of the face;

analyze the second image information to determine a rate of coloration change of the plurality of second representations;

determine that the rate of coloration change corresponds to a heart rate associated with a living human and grant access to a functionality of the computing device requiring authentication.

18. The non-transitory computer-readable storage medium of claim 17, wherein the instructions when executed further cause the computing device to:

flash an illumination element of the computing device between a first time period of capturing a first image frame and a second time period of capturing a second image frame; and analyze the first image frame and the second image frame to determine a reaction of a pupil.

19. The non-transitory computer-readable storage medium of claim 17, wherein the instructions when executed further cause the computing device to:

determine that the one or more first representations correspond to the identity at a level of confidence below a minimum level of confidence;

prompt for performance of a predefined action with a head; and analyze at least the second image information to detect performance of the predefined action with the head.

* * * * *